(12) United States Patent
Tuk et al.

(10) Patent No.: US 12,044,316 B2
(45) Date of Patent: Jul. 23, 2024

(54) RADIAL SEALING SYSTEM

(71) Applicant: Lagersmit Sealing Solutions B.V., Alblasserdam (NL)

(72) Inventors: Andries Arie Tuk, Mijnsheerenland (NL); Teunis Visser, Sliedrecht (NL)

(73) Assignee: Lagersmit Sealing Solutions B.V., Alblasserdam (NL)

( * ) Notice: Subject to any disclaimer, the term of this patent is extended or adjusted under 35 U.S.C. 154(b) by 97 days.

(21) Appl. No.: 17/430,352

(22) PCT Filed: Feb. 17, 2020

(86) PCT No.: PCT/NL2020/050088
§ 371 (c)(1),
(2) Date: Aug. 12, 2021

(87) PCT Pub. No.: WO2020/167129
PCT Pub. Date: Aug. 20, 2020

(65) Prior Publication Data
US 2022/0128151 A1 Apr. 28, 2022

(30) Foreign Application Priority Data
Feb. 15, 2019 (NL) ...................................... 2022585

(51) Int. Cl.
*F16J 15/34* (2006.01)
(52) U.S. Cl.
CPC ....... *F16J 15/3404* (2013.01); *F16J 15/3408* (2013.01); *F16J 15/3416* (2013.01); *F16J 15/3428* (2013.01)

(58) Field of Classification Search
CPC .. F16J 15/3404; F16J 15/3408; F16J 15/3416; F16J 15/3428
See application file for complete search history.

(56) References Cited

U.S. PATENT DOCUMENTS 2,744,772 A * 5/1956 Amirault .................. F16J 15/24
277/379
3,061,320 A * 10/1962 Haensch ............. F16J 15/3456
277/391
3,762,727 A * 10/1973 Jackowski ........... F16J 15/3456
277/374

(Continued)

FOREIGN PATENT DOCUMENTS

NL 6900511 7/1969
NL 2013808 B1 10/2016

*Primary Examiner* — Vishal A Patel
(74) *Attorney, Agent, or Firm* — N.V. Nederlandsch Octrooibureau (57) ABSTRACT

The invention relates to a sealing assembly for the limitation of fluid flow along a rotatable shaft that is passed through a housing member that separates a high pressure side and a low pressure side, wherein the sealing assembly comprises:
a rotor with a sealing surface which essentially extends radially in relation to the shaft,
a flushing sealing system that extends between the rotor and the housing member, which sealing system is in contact with both the housing member and the sealing surface of the rotor to effect a sealing effect, wherein the flushing sealing system comprises an elastic sealing member that in use imposes a targeted compression force on the sealing surface.

16 Claims, 6 Drawing Sheets

(56) References Cited

U.S. PATENT DOCUMENTS

| | | | |
|---|---|---|---|
| 4,103,909 A * | 8/1978 | Hoffman | F16J 15/3236 |
| | | | 277/530 |
| 4,413,830 A | 11/1983 | Pietsch | |
| 4,464,580 A | 8/1984 | Miller et al. | |
| 6,152,452 A | 11/2000 | Wang | |
| 11,428,321 B2 * | 8/2022 | Dubois | F16J 15/32 |
| 2018/0066757 A1 * | 3/2018 | Sakano | F16J 15/164 |
| 2019/0032788 A1 * | 1/2019 | Simon | F16D 57/04 |

* cited by examiner

RADIAL SEALING SYSTEM

BACKGROUND OF THE INVENTION

The invention relates to a sealing assembly for the limitation of fluid flow along a rotatable shaft that is passed through a housing member that separates a high pressure side and a low pressure side, whereby the sealing assembly contains a flushing sealing system.

A sealing devices known from NL6900511 for the sealing off of fluids, in particular a seal of the type with a surface along which a controlled leak occurs for moveable parts, such as rotating shafts. NL6900511 is an example of a "mechanical sealing" with steel sealing surfaces. One difficulty is that high accuracy is required to regulate the leak along the movable steel components, in particular with shafts of large diameters, more than 300 mm, for example.

A seal is known from U.S. Pat. No. 4,413,830 that has a radial design, meaning that sealing elements work in series and are arranged radially, in this case concentrically in relation to each other. U.S. Pat. No. 4,413,830 is an example of a "mechanical sealing".

NL2013808 is an example of a flushing sealing system with a radial design. From this, there is insufficient information on how a good sealing with a good life span can be achieved with the correct compression force.

NL9400686 is also an example of a flushing sealing system with an axial construction, meaning that sealing elements work in series and are arranged axially next to each other. A large mounting length is required for this assembly for great differences in pressure.

SUMMARY OF THE INVENTION

The objective of the invention is to create a sealing assembly for the limitation of fluid flow along a rotatable shaft, which makes the sealing assembly easier to construct and maintain. Easier means, for example, with lower accuracy requirements and improved installation volume per bridged pressure and/or a better manageable leak and life span.

The invention also has the objective of creating a sealing assembly for the limitation of fluid flow along a rotatable shaft whereby a known disadvantage in connection with this type of sealing assembly is at least partially solved.

The invention also has the objective of creating an alternative sealing assembly for the limitation of the fluid flow along a rotatable shaft.

The invention therefore provides a sealing assembly for the limitation of fluid flow along a rotatable shaft that is passed through a housing member that separates a high pressure side and a low pressure side, wherein the sealing assembly comprises:
- a rotor connected to the rotatable shaft, and with a sealing surface which essentially extends radially in relation to the shaft,
- a flushing sealing system that extends between the rotor and the housing member, which sealing system is in contact with both the housing member and the sealing surface of the rotor to provide a sealing effect, wherein the flushing sealing system comprises an elastic sealing member that in use imposes a pressing force directed to the sealing surface, and
- a transport groove pattern with at least one running groove with a driving edge and in fluid connection with the high-pressure side and the low-pressure sides, provided in the sealing surface of the rotor, wherein the sealing member forms a fluid leak path together with the transport groove pattern for flushing of the sealing system for the purpose of forming a hydrodynamic protective fluid film for the sealing assembly and to reduce pressure from the high-pressure side to the low-pressure side,
- wherein a transport groove in the transport groove pattern, in cross-sectional view, has gradual transitions to the sealing surface and the sealing member is elastically formable so that during operation, the sealing member at least partially extends into the transport groove in order to suppress the fluid leak through the fluid leak path.

The elastic sealing member, in combination with the transport groove pattern guarantees a sealing that allows for a flow of the fluid leak that cools and lubricates the elastic member. The permissible fluid leak flow is manageable because the sealing member engages with the transport groove pattern over a contact surface that extends over the sealing surface and because the sealing member at least partially extends into the transport groove in order to suppress the fluid leak through the fluid leakage path. The combination of a hard sealing surface, an elastic sealing element and the gradual transition of a transport groove to the sealing surface makes possible the suppression of the fluid leak. At the same time, the installation length of the sealing assembly is limited because the flushing sealing system extends radial between the rotor and the housing element. In doing this, pressure is reduced in a manageable way while the installation length along the shaft remains limited. The rotor is also referred to as "the shaft portion".

Rotor means that the rotor is connected rotation fixed with the shaft, at least with regard to rotations around the rotatable shaft. The rotor can thus also be designated as a part of the shaft. The housing member is connected to the "fixed world", or said otherwise, is stationary at least with regard to rotations around the rotatable shaft. The sealing surface extends radially with respect to the shaft. The sealing surface is preferably perpendicular to the shaft, even though another position is conceivable as long as there is a radial component. A pressure force targeted axial on the sealing surface, or sealing force, means that this sealing force at least has an axial component wherein axially is related to the rotatable shaft of the sealing construction. The sealing force is generally directed perpendicular to the sealing surface.

Flushing sealing system means a type of sealing whereby pressure is reduced from a high pressure side and on a low pressure side using a controllable flush stream along a fluid leakage path. The flush stream also serves for lubrication, cooling and cleaning of the sealing assembly. The flush stream builds up a hydrodynamic fluid film between the sealing member and the sealing surface and creates a viscous connection between the sealing member and the sealing surface.

Transport groove pattern means a configuration of transport grooves wherein a groove is a recess with respect to the sealing surface. Transport groove means that the groove is formed so that the mutual rotation of the groove pattern and the elastic sealing member causes a controlled fluid leakage path. A gradual transition from one transport groove to the sealing surface mans that there is no sharp transition. After all, a sharp transition, such as perpendicular, would make the extending of the elastic sealing member into the transport groove difficult or even impossible. A running groove means that when the rotor rotates, the groove is shifted radially, or more precisely, a groove segment is shifted in the radial direction seen along a fixed radial direction.

The transport groove pattern will generally be applied in the sealing surface of the rotor because this is easy to replace. It is conceivable, however, that the transport groove pattern is applied to the stationary housing member, such as in the form of an exchangeable part that is releasably connected to the housing part. In the further text of the application, the principle is that the transport groove pattern is applied to the sealing surface of the rotor.

In an embodiment of the sealing assembly, the transport groove pattern extends at least over and outside of a contact surface between the sealing surface and the sealing member. This makes the permitted fluid leak flow even more manageable and simplifies the allowance of a fluid leak flow. In addition, the flushing sealing system is utilized to the fullest extent possible through the overlap of the sealing member and the transport groove pattern.

It is also conceivable that the groove pattern is applied to the elastic sealing member, however that would result in a service life that is too short.

In an embodiment of the sealing assembly, the at least one running groove of the transport groove pattern (8) is V-shaped in cross sectional view. The V-shape offers advantageous throttling (suppressing) characteristics and is easy to install. The V-shaped transport groove has a vertex angle α between 90° and 160°, for example a vertex angle α of 120°. The transport groove is symmetrical seen in cross section, even though an asymmetrical design is also conceivable. The transport groove is made up of flat surfaces seen in cross section, however, the surfaces may also have a curvature.

In an embodiment of the sealing assembly, the contact surface between the sealing surface and the sealing member is processed over at least 85% to obtain the transport groove pattern. A surface created in this proportion offers a good balance between service life and sealing. Contact surface means surface where the sealing surface and the sealing member apply pressure to each other. This pressure will vary along the groove pattern.

In an embodiment of the sealing assembly, the sealing member can be elastically deformable such that during operation, the sealing member extends into the transport groove over at least 80% of the groove height, in particular at least 95% of the groove height. The groove height is related to the maximal height, in case of for example the V-shape in the middle. This degree of elasticity gives a good balance between throttle and the force built up in the axial direction.

In an embodiment, the sealing assembly comprises a dimensionally stable support frame connected with the housing member to support the elastically deformable sealing member. The rotor and the support frame are arranged to mutually rotate with regard to rotations around the rotatable shaft. The flushing sealing system engages the housing member through the support frame. The support frame makes it possible to make the operation of the flushing sealing system completely axial, which is clear from a purely axial orientation of the sealing force on the sealing surface. The support frame offers better control of the degree of suppressing of the fluid leakage path through the fact that the degree of incursion of the sealing member in the groove can be better controlled. The support frame preferably provides support to the entire sealing member.

In an embodiment, the sealing assembly comprises an additional sealing system that engages the housing member and the support frame to provide a sealing effect, wherein the additional sealing system comprises a sealing member that in an embodiment in use at least applies a sealing force directed radially on the housing member. The additional sealing system is not flushed and is so-called "pressureless", meaning that there is no or hardly any pressure reduced over the sealing.

Through the radial orientation of the additional sealing system in combination with the axial orientation of the flushing sealing system, there is a beneficial situation with regard to structural tolerance and the possibility of accommodating movement deviations during operation, such as oscillation of the shaft.

In an embodiment of the sealing assembly, the rotor is rotation fixed connected with the shaft with regard to rotations around the rotatable shaft, and the support frame is rotation fixed connected to the housing member with regard to rotations around the rotatable shaft. This construction is the most advantageous in practice. Another construction is conceivable, whereby, for example, the support frame is rotation fixed with the rotor and the groove pattern is attached to the housing member.

In an embodiment of the sealing assembly, the additional sealing system is arranged at the high pressure side with regard to the flushing sealing system. This construction is the most advantageous in practice.

In an embodiment of the sealing assembly the transport groove pattern comprises one or more of a spiral segment shaped groove, a circumferential groove, a continuous groove, a circular groove, a closed circular groove, an eccentric circular groove, a number of concentric circular grooves.

In an embodiment of the sealing assembly, the support frame and rotor are arranged for mutual axial movement in relation to the shaft. This freedom of movement makes the sealing construction less sensitive to size deviations that could be caused by fabrication tolerances and/or wear and tear. In addition, this freedom makes it possible to press the support frame elastically toward the rotor. In an embodiment of the sealing assembly, the support frame is arranged to slide axially in relation to the shaft.

In an embodiment of the sealing assembly, the elastic sealing member comprises a rubber composite, in particular, the sealing member is made of rubber composite. The rubber composite contributes to the degree of elasticity that gives a good balance between throttle and force build up in the axial direction. A rubber composite with the material property Shore A 70 is, for example, suitable as a sealing member.

In an embodiment of the sealing assembly, the sealing member comprises a solid part and a weakened part and wherein the transport groove pattern extends opposite both the solid part and the weakened part of the sealing member. The division of the sealing member into a solid part and a weakened part offers freedom to adjust the deformability and built up force. The division of the sealing member into a solid part and a weakened part may be done in the radial direction 50/50, even though another ratio is conceivable. Solid means a whole material or a whole core material. A weakened part is a non-solid part, that is, a part with, for example, a cavity or cavities. Preferably, the weakening with regard to the solid part is placed along the interior diameter so that the solid part can take up the greater pressure differences and forces on the exterior diameter. This arrangement is also beneficial for the axial bearing strength of the sealing assembly.

In an embodiment of the sealing assembly the weakened part of the sealing member has a cavity. The cavity offers the option to set the deformability and built-up force. The cavity extends in particular in a ring shape around the shaft. This results in an even deformability and force exertion around the shaft.

In an embodiment of the sealing assembly, the cavity is in fluid connection with the high pressure side. The pressure from the high pressure side helps to bring and keep the sealing member into contact with the sealing surface. In particular, the weakened part of the sealing member has a U-shaped cross section that is open to the high pressure side. The U-shaped cross section makes it more possible to adjust the elastic properties of the elastic sealing member as desired, and at the same time make an open connection from the high pressure side to the cavity formed in the U-shape.

In an embodiment of the sealing assembly, the sealing member is one-piece. This simplifies maintenance because the sealing member can be quickly changed. A single-component can be, for example, an elongated sealing member whereof the ends are attached in a suitable way, such as with adhesive or by melting. Even though a single-component sealing member is advantageous, it will be clear that a multi-part sealing member is conceivable.

In an embodiment, the sealing assembly comprises a spring system that extends into the cavity to preload the sealing member toward the sealing surface of the rotor. The spring system makes it more possible to adjust the elastic properties of the elastic sealing member as desired. In particular, the spring system engages at least one U-shape forming leg to preload it toward the sealing surface of the rotor.

In an embodiment of the sealing assembly, a line of action of the spring system extends axially with regard to the ring-shaped sealing member. The line of action is then perpendicular to the sealing surface and achieves the most effect.

In an embodiment of the sealing assembly, the spring system comprises an elastic tube-shaped member. The tube-shaped member is simple to apply and replace in and from the cavity that is open to the interior circumference. In addition, the spring effect is even over the circumference of the sealing member around the shaft when a tube-shaped element is used.

In an embodiment of the sealing assembly, the spring system is of one-piece. This simplifies maintenance because the spring system can be quickly changed. A single-component can be, for example, an elongated tube member where optionally the ends are attached in a suitable way, such as with adhesive or by melting. Even though a single-component tube-shaped element is advantageous, it will be clear that a multi-part sealing member is conceivable.

In an embodiment of the sealing assembly, the spring system comprises a positioning member that determines the position of the spring system in the cavity. Position can be a radial and/or angled position. The positioning member makes it possible to determine where the spring system engages the sealing member and makes it more possible to control the elastic properties of the elastic sealing member and built-up force.

In an embodiment, the flushing sealing system has at least two sealing members working in series. It will be clear that a design with more than two rings, such as with three or even four, is conceivable. Various combinations are possible, wherein the flushing sealing system has one or more successive sealing members. Successively positioned sealing members do not necessarily all have to be flushed.

In an embodiment of the sealing assembly, the at least two sealing members are ring-shaped and arranged concentrically or eccentrically.

In an embodiment of the sealing construction, the two ring-shaped sealing members both extend in a sealing surface, transversely, in particular perpendicular, in relation to the shaft.

In an embodiment of the sealing assembly, the elastic sealing member of the flushing sealing system is held form-fitted in the support frame. This manner of support makes strain on and deformation of the elastic sealing member more controllable. The form fit is meant to limit the freedom of movement in the radial direction even though entrapment of the sealing element by the support frame is possible in the axial direction. However, this axial entrapment is less necessary because the sealing element is entrapped axial between the support frame and the sealing surface.

In an embodiment of the sealing assembly the two ring-shaped sealing members surround a fluid chamber which is connected to the atmosphere. The fluid chamber is in particular connected to the atmosphere using a discharge pipe. This makes the controlled discharge of the fluid stream easier.

In an embodiment of the sealing assembly, the rotor is separable. This facilitates maintenance because the separable rotor can be quickly changed from and to the shaft.

In an embodiment of the sealing assembly, the sealing member of the additional sealing system comprises one or more of an O-ring, an assembly of an O-ring and a sheathing around the O-ring, a V-shaped groove ring, a bellows sealing connected to the housing element and the support frame, a sealing membrane connected to the housing member and the support frame. All of these embodiments have the advantage that an axial movement, along the shaft, that is, of the support frame with respect to the housing member can be absorbed without loss of the sealing action of the additional sealing system.

In an embodiment, the sealing assembly comprises an external housing member to surround at least one part of the flushing sealing system to prevent leakage of water, wherein the external housing member has an outlet to discharge leak water that has leaked from the flushing sealing system. This makes controlled discharge of the leak fluid more possible.

The current invention also relates to a use of a sealing assembly as described for providing a sealing effect with regard to a rotatable shaft which is guided through a housing member connected to the sealing assembly.

In an embodiment, it is used in a shaft sealing system of a pump.

In an embodiment, it is used in a shaft sealing system of a propulsion shaft of a vessel.

The current invention also relates to a device comprising one or more of the characteristic measures described in the attached description and/or shown in the attached figures.

The current invention also relates to a method comprising one or more of the characteristic steps described in the attached description and/or shown in the attached figures.

It will be clear that the various aspects listed in this patent application can be combined and each considered individually for a divisional patent application.

SUMMARY DESCRIPTION OF THE FIGURES

The invention is clarified using the attached figures, which show.

DESCRIPTION OF THE VARIOUS DESIGNS

Figure 1:
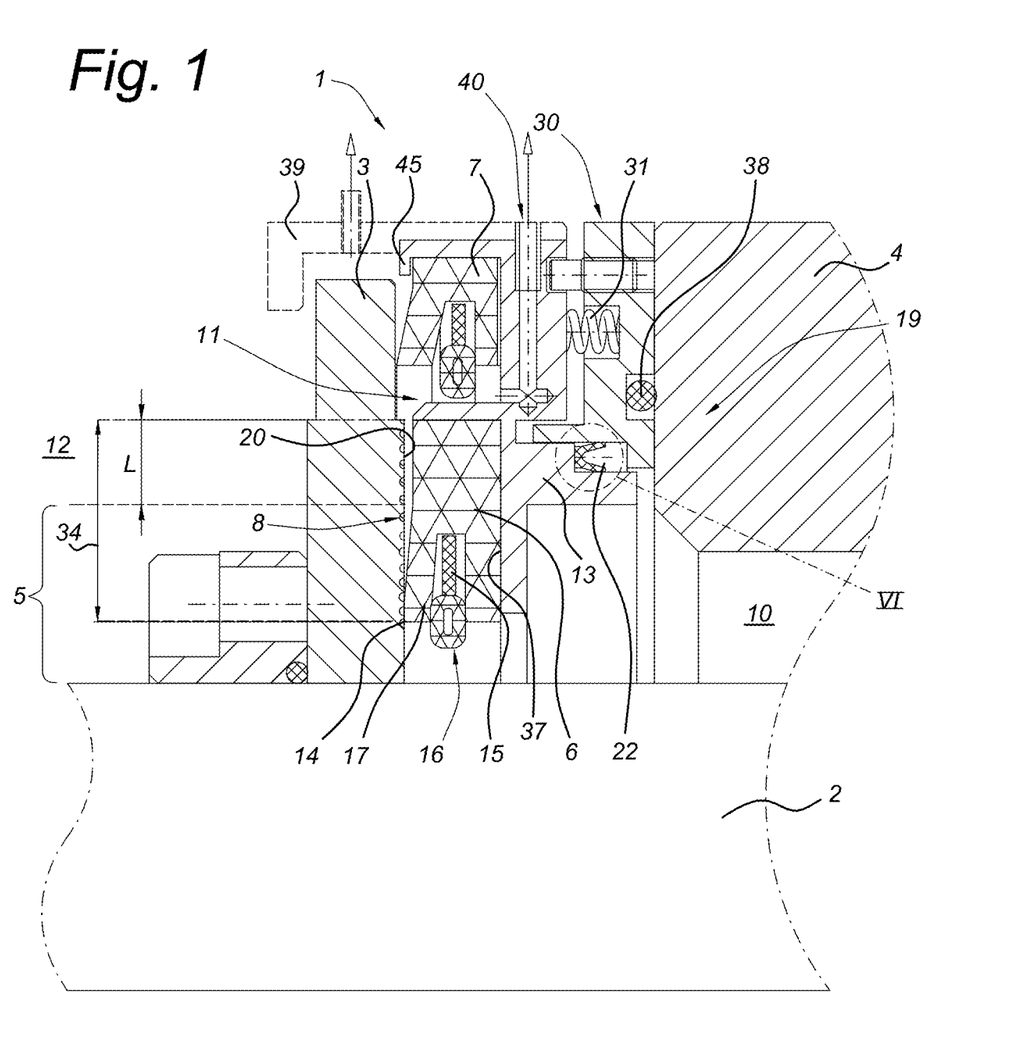
FIG. 1 a cross section of an embodiment of the sealing assembly according to the invention.

FIG. 1 shows a cross section of an embodiment of the sealing assembly 1 according to the invention. Only half of the cross section is shown. It will be clear that the sealing assembly 1 surrounds a shaft 2. The sealing assembly 1 serves to limit fluid flow along the rotatable shaft 2. The shaft 2 is passed through a housing member 4. The housing member separates a high pressure side 10 and a low pressure side 12. On the low pressure side 12 an atmospheric pressure normally prevails because the low pressure side 12 is directly or indirectly in contact with the atmosphere. The sealing assembly 1 reduces the pressure difference between the high pressure side 10 and the low pressure side 12. This pressure difference exists over the rotatable shaft 2 and the housing member 4 that are arranged mutually moveable. The sealing assembly 1 operates between the housing member 4 and the rotatable shaft 2.

The sealing assembly 1 comprises a rotor 3. The rotor 3 rotates with the shaft 2 around the longitudinal axis of the shaft 2. The rotor 3 has a sealing surface 20. The sealing surface extends radially with respect to the shaft 2. The shaft 2 is passed through a central hole 25 of the rotor 3. The rotor 3 is divisible designed so that it is easy to replace.

The sealing assembly 1 comprises a flushing sealing system 5. The flushing sealing system 5 grasps both the sealing housing member 4 as well as the sealing surface 20 of the rotor to provide a sealing effect. The flushing sealing system 5 extends between the sealing housing member 4 and the sealing surface 20 of the rotor 3. The flushing sealing system 5 extends radially between a large part of the overlap between the sealing housing member 4 and the sealing surface 20 of the rotor 3 seen in an axial direction from the shaft 2.

The flushing sealing system 5 comprises a ring-shaped elastic sealing member 6. The flushing sealing system 5 comprises a transport groove pattern 8. The sealing member 6 applies a sealing force directed toward the sealing surface 20 that is not further shown. The sealing member 6 forms a fluid leakage path with the transport groove pattern 8, which is shown as 14 even though not easily visible. The transport groove pattern 8 is in fluid connection with the high pressure side 10 and the low pressure side 12. A leak flow flows through the fluid leakage path 14. The leakage path serves for the flushing and cooling of the flushing sealing system 5. The fluid leakage path 14 extends in a ring shape between the rotor 3 and the sealing member 6. The leak flow forms a hydrodynamic fluid film between the rotor 3 and the sealing member 6 for the necessary protection from wear. The protective fluid film ensures a viscous contact between the sealing surface 20 and the sealing member 6. Pressure is reduced from the high pressure side 10 to the low pressure side 12 along the leak flow over the fluid leakage path.

The transport groove pattern 8 is applied here in the sealing surface 20 of the rotor 3. The transport groove pattern 8 engages a contact surface 34 between the sealing member 6 and the sealing surface 20. The contact surface 34 extends around the shaft 2. The contact surface 34 extends here over the entire transport groove pattern 8. The transport groove pattern 8 extends over nearly the entire height of the sealing member 6, meaning the radial direction of the rotor 3.

The sealing assembly 1 includes a dimensionally stable support frame 13 for the support of the elastic deformable sealing member 6. The support frame 13 supports the sealing member 6 at least on the exterior circumference and the side 37 of the sealing member 6 turned away from the sealing surface 20 of the rotor 3. The sealing member 6 is enclosed between the support frame 13 and the sealing surface 20 of the rotor 3. This retains shape of the sealing member 6 despite the elasticity of it. The sealing member 6 of the flushing sealing system 5 is held form-fitted in the support frame 13.

The support frame 13 is arranged to be slightly moveable so that the sealing member 6 can be oriented toward the sealing surface 20 of the rotor 3. Therefore, the support frame 13 and the rotor 3 can be mutually moved axially in relation to the shaft 2. Here, this mutual movability is possible because the support frame 13 can be sled in an axial direction in relation to the shaft 2 while the shaft portion 3 is securely attached to the shaft 2.

The support frame 13 is connected to the housing member 4. The rotor 3 and the support frame 13 are arranged to rotate together with regard to the rotations around the rotatable shaft 2. Therefore, the rotor 3 is rotation fixed attached with the shaft 2 with regard to rotations around the rotatable shaft 2, and the support frame 13 is rotation fixed connected to the housing member 4 with regard to rotations around the rotatable shaft 2. The flushing sealing system 5 engages the housing member 4 using the support frame 13. The support frame 13 is connected to the housing member 4 here with a loose fit.

The sealing assembly 1 encompasses an additional sealing system 19. The additional sealing system engages the housing member 4 and the support frame 13 to provide a sealing effect between the support frame 13 and the housing member 4. The additional sealing system 19 is on the high pressure side 10 with regard to the flushing sealing system 5. Where the flushing sealing system allows for unlimited mutual rotation around the shaft 2, the additional sealing system 19 is static with regard to rotation around the shaft 2. The additional sealing system 19 comprises a sealing member 22. In use, the sealing member 22 applies a radial sealing force on the housing member 4. Here the sealing member 22 has a rod sealing that connects the support frame 13 and the housing member 4 in a fluid sealing manner.

In addition, the support frame 13 is connected with the housing member 4 using a spacer ring 30. The spacer ring 30 is connected fluid tight to the housing member 4 using an O-ring 38. The spacer ring 30 is not described in detail. The spacer ring 30 facilitates preloading of the flushing sealing system 5 and the freedom of movement of the support frame 13. A spring system 31 preloads the support frame 13 toward the rotor 3.

The flushing sealing system 5 of the sealing assembly 1 comprises two ring-shaped elastic sealing members 6, 7. The sealing member 6 of the flushing sealing system 5 is arranged for the distribution of pressure reduction throughout the sealing assembly 1. The ring-shaped elastic sealing member 7 located on the exterior circumference of the sealing assembly 1 functions as a pressureless sealing that is not flushed or where flushing is not necessary.

The two ring-shaped elastic sealing members 6, 7 operate in series.

The two ring-shaped sealing members 6, 7 are arranged concentrically and both extend transversely into a sealing surface toward the shaft 2. The sealing member 7 of the pressureless sealing is held form fitted in the support frame 13 as well. The form-fitting is meant to limit the freedom of movement in the radial direction as well as an entrapment of the sealing member 7 by the support frame 13 in the axial direction. This axial entrapment is also realised here by a locking cam 45.

The two ring-shaped sealing members 6, 7 surround a fluid chamber 11. The fluid chamber 11 is connected to the atmosphere. Here the fluid chamber 11 is connected to the atmosphere using a discharge pipe. The sealing assembly 1 comprises an exterior housing member 39. The exterior housing member 39 surrounds the flushing sealing system to prevent water leaks. The exterior housing member contains an outlet 40 for the discharge of leak water that has leaked from the flushing sealing system 5. The outlet 40 is in fluid connection with the discharge pipe.

Figure 2:
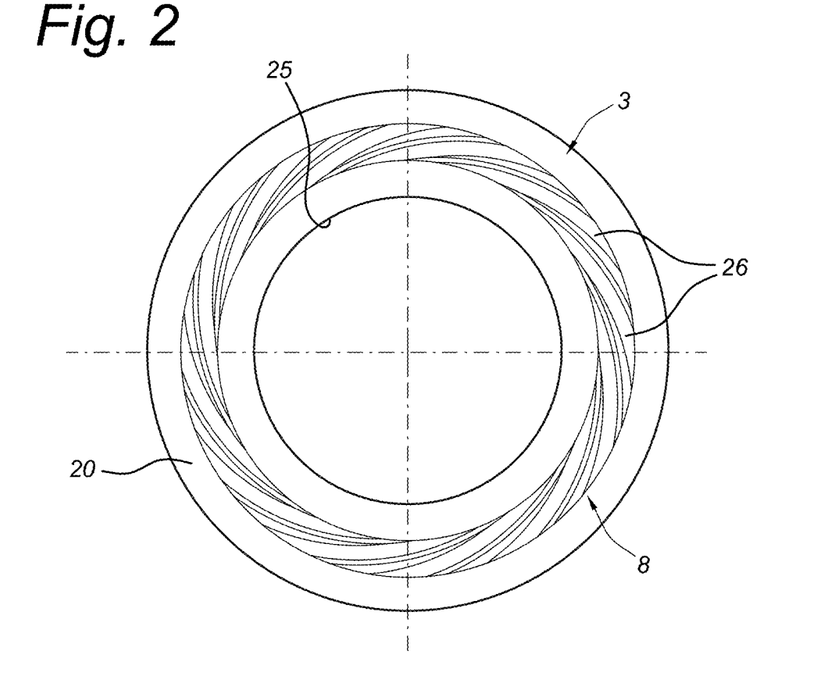
FIG. 2 an embodiment of the transport groove pattern of the sealing assembly in FIG. 1.

FIG. 2 shows an embodiment of the transport groove pattern 8 of the sealing assembly 1 in FIG. 1. The transport groove pattern 8 is applied here in the sealing surface 20 of the rotor 3. The transport groove pattern 8 extends around the central hole 25 of the rotor 3. The transport groove pattern 8 here includes a number of spiral-segment shaped grooves 26. The grooves 26 have open ends.

Figure 3:
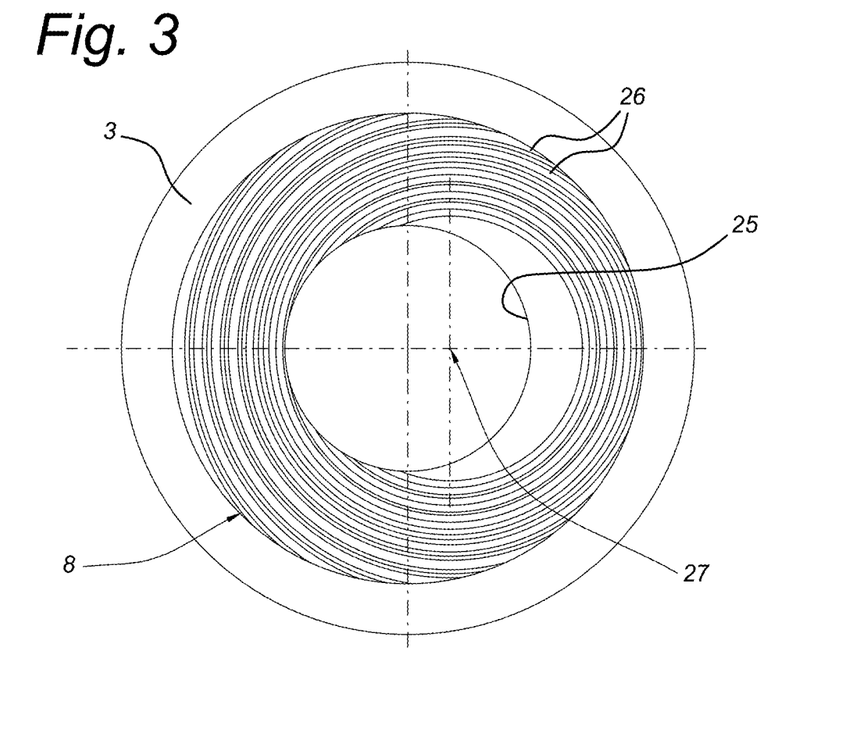
FIG. 3 another embodiment of the transport groove pattern of the sealing assembly in FIG. 1.

FIG. 3 shows a design of the transport groove pattern 8 of the sealing assembly 1 in FIG. 1. The transport groove pattern 8 is applied here in the sealing surface 20 of the rotor 3. The transport groove pattern 8 extends around the central hole 25 of the rotor 3. The transport groove pattern 8 here includes a number of concentric circular grooves 26. The grooves 26 are continuous, meaning uninterrupted. The grooves 26 circulate around the shaft 2. A part of the concentric circular grooves 26 form a closed circle. Part of the concentric circular grooves 26 have open ends at the exterior circumference of the rotor 3. The mid-point 27 of the concentric circular grooves 26 is eccentric with respect to the mid-point of the rotor 3.

Figure 4:
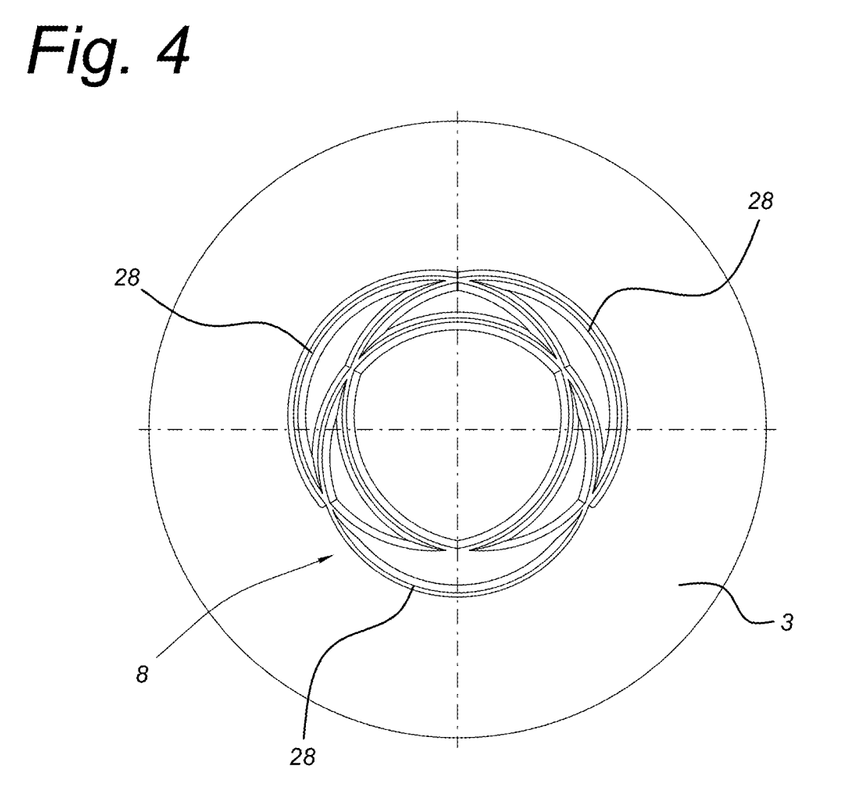
FIG. 4 yet another embodiment of the transport groove pattern of the sealing assembly in FIG. 1.

FIG. 4 shows yet another embodiment of the transport groove pattern 8 of the sealing assembly in FIG. 1. The transport groove pattern 8 here comprises 3 circular grooves 28. The circles overlap so that the grooves 28 intersect. The mid-point of each of the circular grooves 28 is eccentric with respect to the mid-point of the rotor 3.

Figure 5:
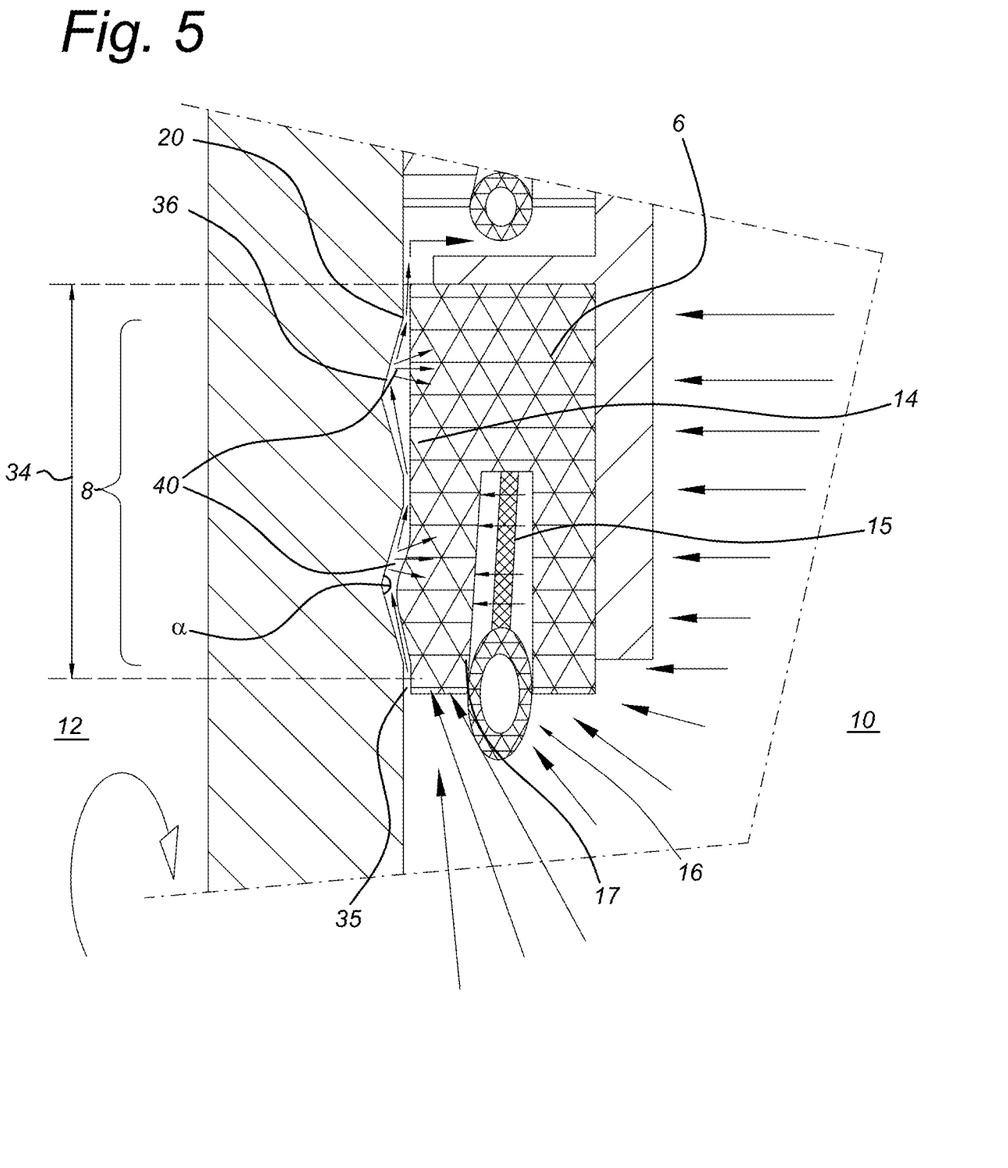
FIG. 5 a cross section of a detail of the sealing assembly in FIG. 1.

FIG. 5 shows a cross section of a detail of sealing assembly 1 in FIG. 1.

A transport groove 36 of the transport groove pattern 8 has gradual transitions to the sealing surface 20 seen in cross section. The transport groove 36 is V-shaped seen in cross section. The V-shaped transport groove 36 has a vertex angle $\alpha$ of approximately 120°.

The sealing member 6 is elastically deformable so that during operation, the sealing member 6 at least partially extends into the transport groove 36 to suppress the fluid leakage path 14. The sealing member 6 is elastically deformable in such a way that during operation, the sealing member 6 extends into the transport groove 36 over at least 20% to 80% of the groove height.

The grooves 36 of the transport groove pattern 8 have a common surface projected on the sealing surface 20 such that about 95% of at least the contact surface is processed to obtain the groove pattern.

The leakage flow through the fluid leakage path forms a protective fluid film 35 between the rotor 3 and the sealing member 6. The protective fluid film 35 ensures a viscous contact between the sealing surface 20 of the rotor 3 and the sealing member 6. Pressure is reduced from the high pressure side 10 to the low pressure side 12 along the leakage flow over the fluid leakage path 14.

Figure 6:
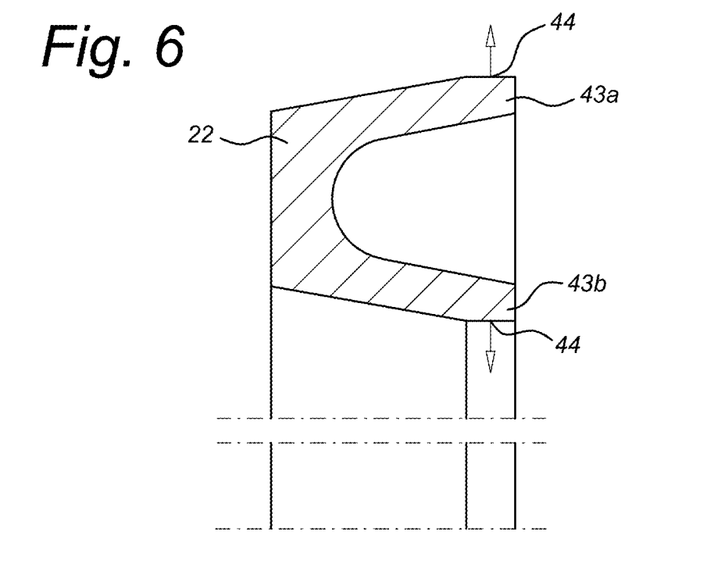
FIG. 6 shows a detail of the additional sealing system in the embodiment of FIG. 1 in cross section.

FIG. 6 shows a detail of the additional sealing system in the embodiment of FIG. 1 in cross section. The additional sealing system comprises a sealing member 22. Here the sealing member 22 is a rod sealing. In use, the two opposite legs 43a, 43b apply a sealing force 44 radially oriented on the housing member 4 and the support frame 13.

Figure 7:
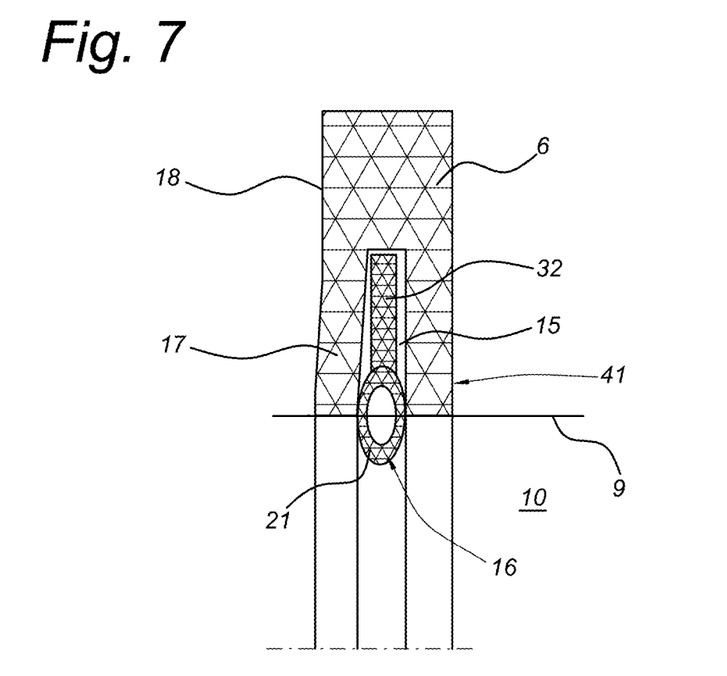
FIG. 7 shows a part of the flushing sealing system 5.

FIG. 7 shows a part of the flushing sealing system 5. The figure is a cross section of the ring-shaped elastic sealing member 6. Only half of the cross section is shown. It will be clear that the sealing member 6 surrounds the shaft 2. The sealing member 6 is designed as a single-component. The elastic sealing member 6 is made of a rubber composite that helps determine the elasticity of the sealing member 6. The elastic sealing member 6 has a U-shaped cross section. Therefore the elastic sealing member 6 has a cavity 15. The cavity 15 extends here continuous in a ring shape around the shaft 2. The cavity 15 is oriented toward the high pressure side 10. The cavity 15 is open toward the high pressure side 10. This means that the cavity 15 is in fluid connection with the high pressure side 10. The cavity 15 is placed out of the centre of the sealing member 6.

The flushing sealing system 5 comprises a spring system. The line of action 9 of the spring system 16 is oriented axially with respect to the ring-shaped sealing member 6.

The spring system 16 extends into the cavity 15. The spring system 16 extends into the entire cavity 15 to be able to provide an even spring tension. The spring system 16 extends between the support frame 13 and sealing surface 20. The spring system 16 preloads a U-shape forming leg 17 toward the sealing surface 20 of the rotor 3. The spring system 16 includes here an elastic tube-shaped member 21. The tube-shaped member 21 is here made up of one piece, or in other words, single-component. The tube-shaped member 21 is open, such as at the ends. This means that the interior of the tube-shaped member 21 is in fluid connection with the high pressure side 10. The tube-shaped member 21 operates at the height of the free end of the leg 17. The spring system 16 has a positioning member 32. The positioning member 32 determines the position of the spring system in the cavity. The positioning member 32 determines in this case the radial position of the spring system in the cavity. The positioning member 32 determines the mutual position of the spring system and the sealing member 6. Here, the positioning member 23 is a lip. The lip extends along the tube member 21. The lip extends along the entire length of the tube member 21. The lip extends into the cavity 15 and engages the interior surface of the cavity 15.

The sealing member 6 has a solid part 18 and a weakened part 41. The transport groove pattern 8 extends opposite both the solid part 18 and the weakened part 41 of the sealing member 6. The sealing member 6 here has a weakened part 41 in the form of a U-shaped part. The U-shaped leg 17 opposite the transport groove pattern 8 reduces pressure. The solid part 18 provides for the further build-up of the hydrodynamic lubrication film, and bearing force that absorbs the pressure on the high pressure side 10, such as pump pressure.

Figure 8A:
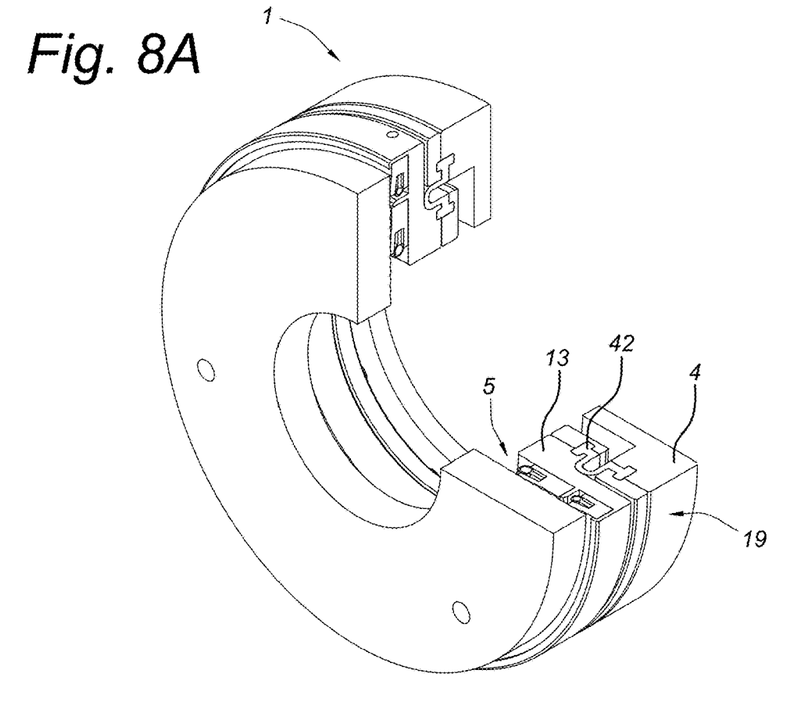
FIG. 8a, 8b a perspective view and a cross section in side-view of a second embodiment of the sealing assembly.
Figure 8B:
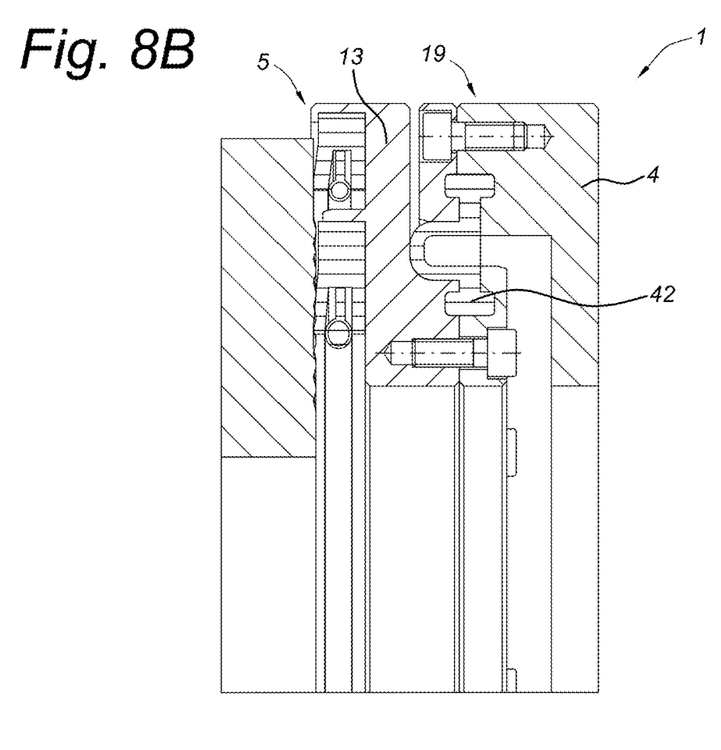

FIGS. 8a and 8b show a perspective view and sectional view of a second embodiment of the additional sealing system 19. The sealing member of the additional sealing system 19 is here a bellows sealing 42, or a membrane, that is in sealing connection with the housing member 4 and the support frame 13. The bellows sealing 42 is shown here in the sealing assembly 1 and in connection with the flushing sealing system 5.

It will be clear that the specification above is included to illustrate the operation of the preferred embodiments of the invention, and not to limit the extent of the invention. From the presentation above, it will be evident to a skilled person that there are many variations that fall under the spirit and extent of the current invention.

The invention claimed is:

1. A sealing assembly for limitation of fluid flow along a rotatable shaft that is passed through a housing member that separates a high pressure side and a low pressure side, wherein the sealing assembly comprises:
    a rotor connected to the rotatable shaft, and with a sealing surface which essentially extends radially in relation to the shaft,
    a flushing sealing system that extends between the rotor and the housing member, the flushing sealing system in contact with both the housing member and the sealing surface of the rotor to provide a sealing effect,
    the flushing sealing system comprising first and second elastic sealing members that each comprise a separate ring-shaped sealing member arranged to surround a fluid chamber which is connected to atmosphere by a discharge pipe, the first and second elastic sealing members working in series, and the first elastic sealing member is adapted to imposes a pressing force directed to the sealing surface,
    a transport groove pattern with at least one running groove with a driving edge and in fluid connection with the high-pressure side and the low-pressure side, the transport groove pattern provided in the sealing surface of the rotor,
    a fluid leak path formed between the first sealing member and the transport groove pattern and configured for flushing of the flushing sealing system for the purpose of forming a hydrodynamic protective fluid film for the sealing assembly and to reduce pressure from the high-pressure side to the low-pressure side,
    a transport groove in the transport groove pattern having, in cross-sectional view, gradual transitions to the sealing surface, the first elastic sealing member at least partially extending into the transport groove in order to suppress fluid leakage through the fluid leak path,
    a dimensionally stable support frame connected with the housing member to support the first elastic sealing member, and a spring system that preloads the support frame towar the rotor,
    an additional sealing system that engages the housing member and the support frame to provide a sealing effect, the additional sealing system comprising a spacer ring connected to the housing member, and a sealing member contacting the spacer ring and the dimensionally stable support frame, the sealing member applying a radial sealing force.

2. The sealing assembly according to claim 1, wherein the transport groove pattern extends at least over and outside of a contact surface between the sealing surface and the first elastic sealing member.

3. The sealing assembly according to claim 2, wherein the contact surface between the sealing surface and the first elastic sealing member is processed over at least 85% to obtain the transport groove pattern.

4. The sealing assembly according to claim 1, wherein the first elastic sealing member extends into the transport groove over at least 80% of the groove height, in particular at least 95% of the groove height.

5. The sealing assembly according to claim 1, wherein the rotor is rotation fixed connected with the shaft with regard to rotations around the rotatable shaft, and the support frame is rotation fixed connected to the housing member with regard to rotations around the rotatable shaft.

6. The sealing assembly according to claim 1, wherein the support frame and rotor are arranged for mutual axial movement in relation to the shaft.

7. The sealing assembly according to claim 1, wherein the support frame is arranged for axial movement in relation to the shaft.

8. The sealing assembly according to claim 1, wherein the first elastic sealing member comprises a rubber composite, and in particular is made of the rubber composite.

9. The sealing assembly according to claim 1, wherein the first elastic sealing member comprises a solid part and a weakened part, and the transport groove pattern extends opposite both the solid part and the weakened part.

10. The sealing assembly according to claim 9, wherein the weakened part has a cavity that extends particularly in a ring shape around the shaft.

11. The sealing assembly according to claim 10, wherein the cavity is in fluid contact with the high pressure side and in particular, the weakened part has a U-shaped cross section that is open to the high pressure side.

12. The sealing assembly according to claim 10, comprising a spring system that extends into the cavity to preload the first elastic sealing member toward the sealing surface of the rotor, in particular to preload at least a U-shape forming leg toward the sealing surface of the rotor.

13. The sealing assembly according to claim 12, wherein a line of action of the spring system extends axially with regard to the ring-shaped first elastic sealing member.

14. The sealing assembly according to claim 12, wherein the spring system comprises an elastic tube-shaped member.

15. The sealing assembly according to claim 12, wherein the spring system comprises a positioning member that determines the position of the spring system in the cavity.

16. The sealing assembly according to claim 1, comprising an external housing member configured to surround at least one part of the flushing sealing system to prevent leak of water, the external housing member comprising an outlet to discharge water that has leaked from the flushing sealing system.

* * * * *